May 18, 1926. 1,584,779
G. C. KRUG
CHEMICAL GARDEN AND METHOD OF MAKING THE SAME
Filed Sept. 5, 1925
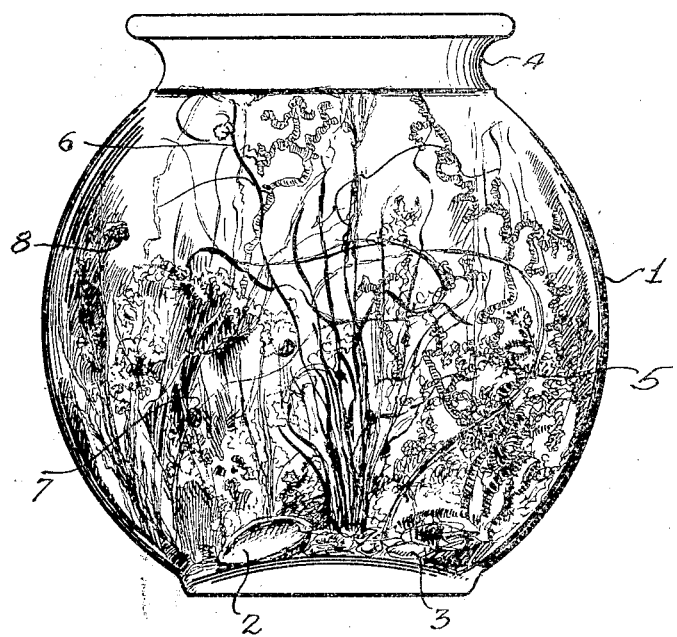
Inventor
George C. Krug.
by Attys Patented May 18, 1926.

1,584,779

UNITED STATES PATENT OFFICE.

GEORGE C. KRUG, OF MILWAUKEE, WISCONSIN, ASSIGNOR TO THE GARDEN NOVELTY CO., OF MILWAUKEE, WISCONSIN, A CORPORATION OF WISCONSIN.

CHEMICAL GARDEN AND METHOD OF MAKING THE SAME.

Application filed September 5, 1925. Serial No. 54,677.

This invention relates to a chemical garden and more particularly to "artificial vegetation" and a method of forming the same from inorganic salts.

It has long been known that salts of the heavier metals have a tendency to grow when placed in a solution of sodium silicate but so far as is known this knowledge has not been put to any practical application.

It is therefore an object of this invention to provide a novel and educational device in the nature of a chemical garden formed by growing various metallic salts in a solution of sodium silicate in combination with a transparent receptacle containing artistically arranged sea shells, sea beans and the like.

It is a further object of this invention to provide a chemical garden that may serve as a toy having considerable educational value, as well as affording very beautiful artistic results in coloring and formation.

Other and further important objects of this invention will be apparent from the disclosures in the specification and the accompanying drawing.

This invention (in a preferred form) is illustrated in the drawing and hereinafter more fully described.

On the drawing:

The figure shown on the drawing is an elevational view of a device embodying the principles of my invention, showing a chemical garden full grown.

As shown on the drawing:

In preparing my chemical garden I use a solution of sodium silicate, preferably from 5 to 45 degrees Baumé, with a ratio of sodium oxide to silica ranging from 1 to 1.5, to 1 to 4. While many water soluble metallic salts are suitable for forming "artificial vegetation" in a solution of sodium silicate, I have selected a variety of salts adapted to give a wide range of colored "vegetation". To produce a violet "vegetation" I use such cobalt salts as the chloride, nitrate or sulphate. Copper salts in general give a blue coloration and of the various water soluble copper salts I may mention cupric bromide, chloride, phosphate, nitrate or sulphate, or cuprous sulphate. A reddish brown color is obtained by using an iron salt such as a ferrous bromide, chloride and sulphate. To obtain a green color I use a nickel salt, preferably a sulphate or a halide. Manganous halides, nitrates phosphates or sulphates all give a white colored growth. Uranium on the other hand produces a bright yellow "vegetation" when added in the form of a halide or nitrate.

When any of the above salts are added to a solution of sodium silicate, said salts either immediately or in a short while commence to grow. The explanation of this is that the silicates of all the metals, except the alkaline metals, are insoluble. Consequently when a water soluble salt of a heavy metal is placed in a water solution of a soluble silicate, a coating of an insoluble silicate of said heavy metal is formed over the salt, but due to the tendency of the water soluble salt to go into solution it exerts a certain amount of osmotic pressure, tending to break through the insoluble coating.

When such osmotic pressure is sufficient to rupture the insoluble coating, an expansion of the salt takes place. With certain of the salts this expansion is very rapid and almost continuous so that it is easily perceptible to the human eye. In other salts the growth is slower and requires a matter of hours before completion. The growth continues until sufficient water has combined with the water soluble salt to reduce its osmotic pressure to such an extent that it no longer ruptures the outer insoluble coating. Incidentally, during the growth of the salts, bubbles, probably of air coming out of the solution, are formed on the growths. These bubbles in their tendency to rise assist in directing the sprouts as they form toward the surface by causing a buoyant action upon them.

In my chemical garden illustrated in the drawing I have shown a transparent globe or aquarium 1 which is preferably spherical in shape, as such shape tends to magnify the contents of the aquarium. In the aquarium 1, I first place a few shells 2 and red sea beans 3, or other decorative articles. I then pour a solution of sodium silicate of suitable strength into the aquarium, filling the same up to its neck 4. Salts of the various metals above enumerated are next added in sufficient quantities to give a fairly dense "vegetation", as may be determined by experiment. These salts should be as anhydrous as possible and must, therefore, be kept in a closed retainer, since many of them are hygroscopic. To obtain the full range of colors available I add a few crystals of each of the various metallic salts. After this is done a suitable cover, such as a watch crystal, should be placed over the mouth of the aquarium 1 in order to prevent evaporation of the solution and dust from falling into the solution. The iron salts are among the first to start to grow, a knobby-like growth appearing almost immediately. When full grown the "vegetation" resulting is of irregular knotty formation, as indicated at 5. The cobalt salts also grow very rapidly into a ribbon-like growth 6. Other salts form frond-like "vegetation" 7, and still others bunch up to form clusters 8. The appearance of the combined growths of the various salts is especially artistic and beautiful as a result of the various colors produced and the delicate stalks and branches resembling real vegetation. The artistic effect is further heightened by the addition of pearly shells, brilliantly colored sea beans and the like. When the whole is viewed through the magnifying effect of the transparent aquarium it is indeed a very artistic and realistic sight.

A chemical garden such as above described is of considerable educational value as it prompts the observer to investigate the cause of such an unusual phenomenon as that of inorganic chemical salts sprouting in the same way as vegetable and plant seeds.

The chemical garden further provides a novelty that serves the place of a toy in the home.

As the artificial vegetation, when fully grown, is not only beautiful but permanent, if not violently disturbed, it forms a lasting ornament in the household.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The process of making a chemical garden, which comprises adding to a water solution of a silicate a plurality of different salts of the heaver metals.

2. The process of making a chemical garden, which comprises adding to a water solution of an alkali silicate a plurality of water soluble salts of cobalt, copper, iron, nickel, manganese, uranium and other non-alkali metals.

In testimony whereof I have hereunto subscribed my name.

GEO. C. KRUG.